(12) United States Patent
Zhu et al.

(10) Patent No.: US 7,229,220 B2
(45) Date of Patent: Jun. 12, 2007

(54) OPTICAL FIBER CONNECTOR

(75) Inventors: ZiQiang Zhu, Kunsan (CN); Jinkui Hu, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 89 days.

(21) Appl. No.: 11/000,748

(22) Filed: Nov. 30, 2004

(65) Prior Publication Data

US 2005/0123247 A1   Jun. 9, 2005

(30) Foreign Application Priority Data

Dec. 6, 2003   (CN) ........................ 2003 2 0120350

(51) Int. Cl.
*G02B 6/36* (2006.01)
(52) U.S. Cl. .......................... 385/92; 385/88
(58) Field of Classification Search ............. 385/88–94
See application file for complete search history.

(56) References Cited

U.S. PATENT DOCUMENTS 5,274,722 A * 12/1993 Saitoh et al. .................. 385/78
6,481,902 B2   11/2002 Takaoka et al.
6,554,495 B1 * 4/2003 Zhu et al. ...................... 385/92
6,652,152 B2 * 11/2003 Yang et al. .................... 385/53
6,796,719 B2 * 9/2004 Zhu et al. ...................... 385/76
2003/0219216 A1 * 11/2003 Yang et al. .................... 385/88

FOREIGN PATENT DOCUMENTS

JP          6-331859        12/1994

* cited by examiner

*Primary Examiner*—Frank G. Font
*Assistant Examiner*—Derek L. Dupuis
(74) *Attorney, Agent, or Firm*—Wei Te Chung

(57) ABSTRACT

An optical fiber connector (30) includes a housing defining a cavity (314) and a receiving space (364) therein, an optical element (34) received in the cavity and a protecting member received in the receiving space. The protecting member includes a door (32) defining an aperture (322) therein and a spring member (33) assembled to the door. The spring member is deformable in the cavity along a front-to-back direction when a fiber plug (40) is inserted/withdrawn. The protecting member occupies a small inner space of the optical fiber connector.

14 Claims, 8 Drawing Sheets

OPTICAL FIBER CONNECTOR

BACKGROUND OF THE INVENTION

1. Field of the Invention

The present invention generally relates to an optical fiber connector, and more particular to an optical fiber connector having a protecting member.

2. Description of Prior Art

Present telecommunication technology develops, to an increasing extent, optical fiber for signal transmission. The use of optical fibers, in turn, requires numerous collateral components especially adapted to handle the light or optical transmission, among which are optical fiber connectors.

Optical fiber connector for connecting digital systems mostly use a transmitting rod for alignment and support the fiber. Examples of optical fiber connector that uses a plastic fiber within a ferrule include: i) the F07 Duplex Plastic Fiber System from AMP; ii) the SMI (small Muti-media Interface) Connector from Sony Corporation; and iii) the HFBR series of plastic fiber connector from Hewlett Packard. For assuring performance of the optical connector, it is necessary that a door prevents dust and vapor in the air from entering the optical fiber connectors.

As shown in FIG 1, Japanese Patent Publication No. 6-331859 discloses an optical fiber connector, which comprises a housing 1 holding an optical element 11 therein, a rotatable door 13 assembled to the housing 1. The housing 1 defines a cavity 12 therein for receiving a complementary optical fiber plug 2 with a mating portion 21. Once the complementary optical fiber plug 2 is inserted into the housing 1, the rotatable door 13 is rotated to an open position. When the optical fiber plug 2 is withdrawn from the optical fiber connector, the rotatable door 13 is closed to avoid entry of dust into the optical fiber connector. However, the rotatable door 13 is outside the housing 1 when the fiber plug 2 is received in the cavity 12 of the housing 1, which is easy to be damaged arid increases the space occupied by the optical fiber connector.

FIG. 2 shows another optical fiber connector, which is disclosed in U.S. Pat. No. 6,652,152. The optical fiber connector comprises an elastic door 101 and a housing 10. A fiber 201 is embedded in a fiber plug 20. The elastic door 101 is elastically pushed inwardly in a cavity 102 of the housing 10 by an external force when insertion a mating portion 202 of the fiber plug 20 and restores back to original state when the fiber plug 20 is withdrawn from the optical fiber connector. However, the cavity 102 has to provide enough space for receiving the inwardly rotated elastic door 101 therein, which is adverse to minimization of the optical fiber connector. Moreover, the elastic door 101 should be opened by a knock of the fiber plug 20, which consequently leads to abrasion of the fiber 201 after repeated insertion/withdrawal of the fiber plug 20.

Hence, an optical fiber connector having a protecting member is desired to overcome the disadvantages of the prior art.

BRIEF SUMMARY OF THE INVENTION

Accordingly, it is an object of the present invention to provide an optical fiber connector having a protecting member, which is received within and requires a small inner space of the optical fiber connector.

In order to achieve the above-mentioned object, an optical fiber connector in accordance with the present invention comprises a housing defining a cavity and a receiving space therein, an optical element received in the cavity and a protecting member received in the receiving space. The protecting member comprises a slidable door defining an aperture therein and a spring member assembled to the door.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
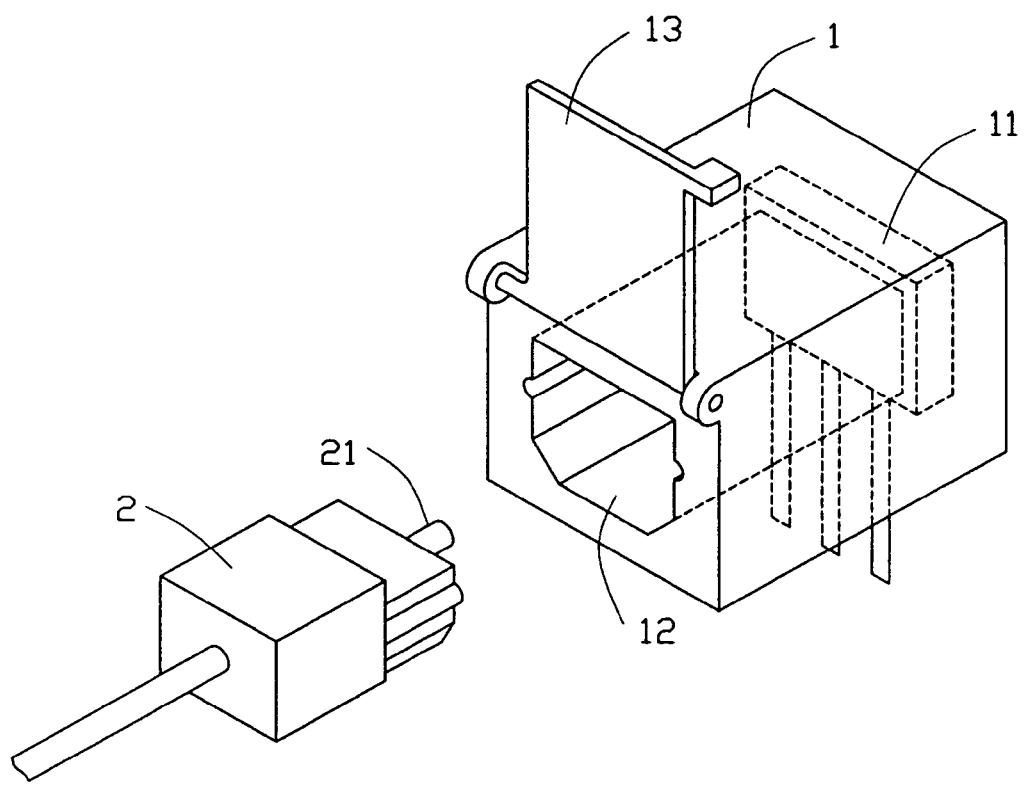
FIG. 1 is a perspective view of a conventional optical connector and a complementary optical fiber plug.
Figure 2:
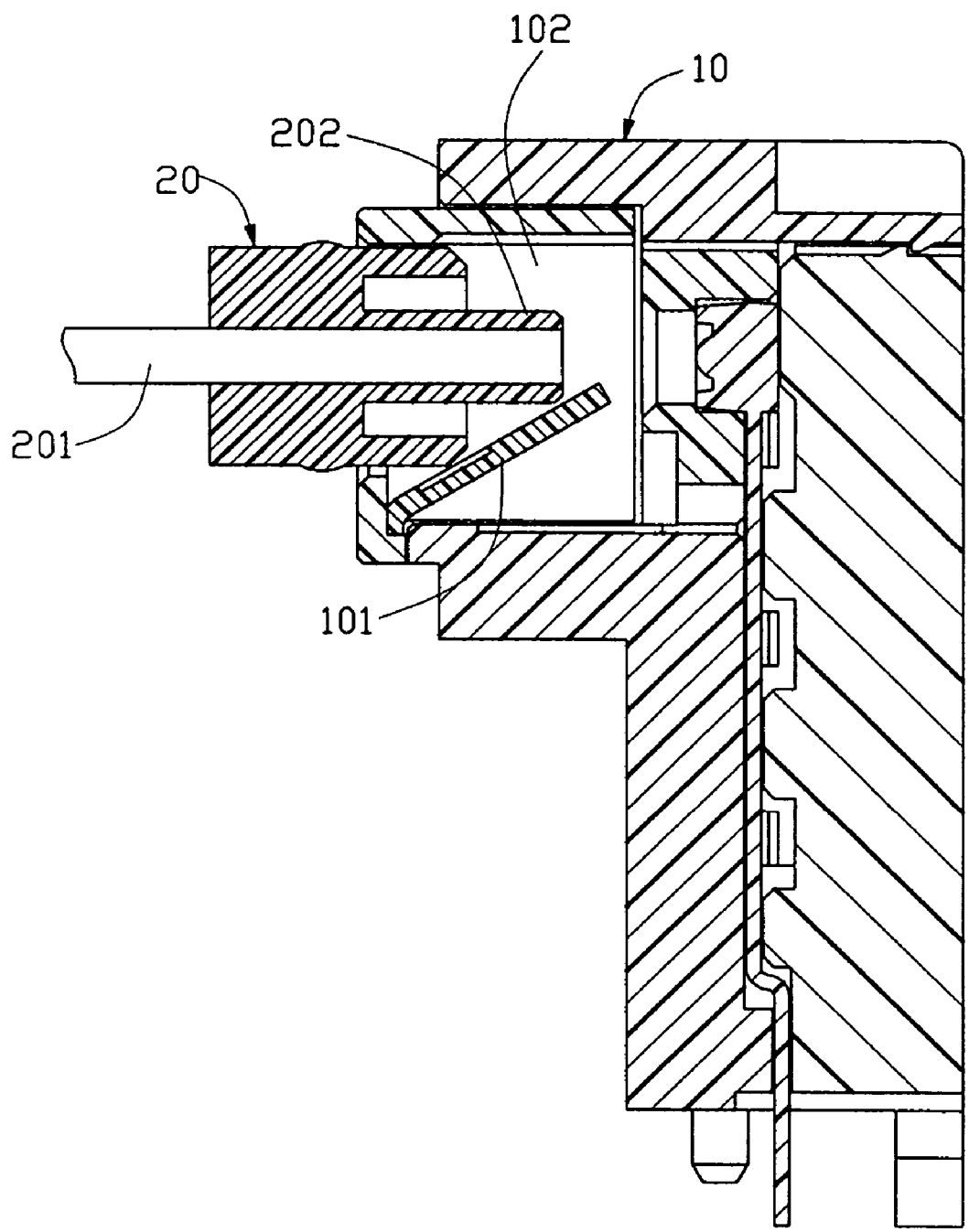
FIG. 2 is a cross-sectional view of another conventional optical connector and a mated complementary optical fiber plug.

Reference will now be made to the drawing figures to describe the present invention in detail.

Figure 3:
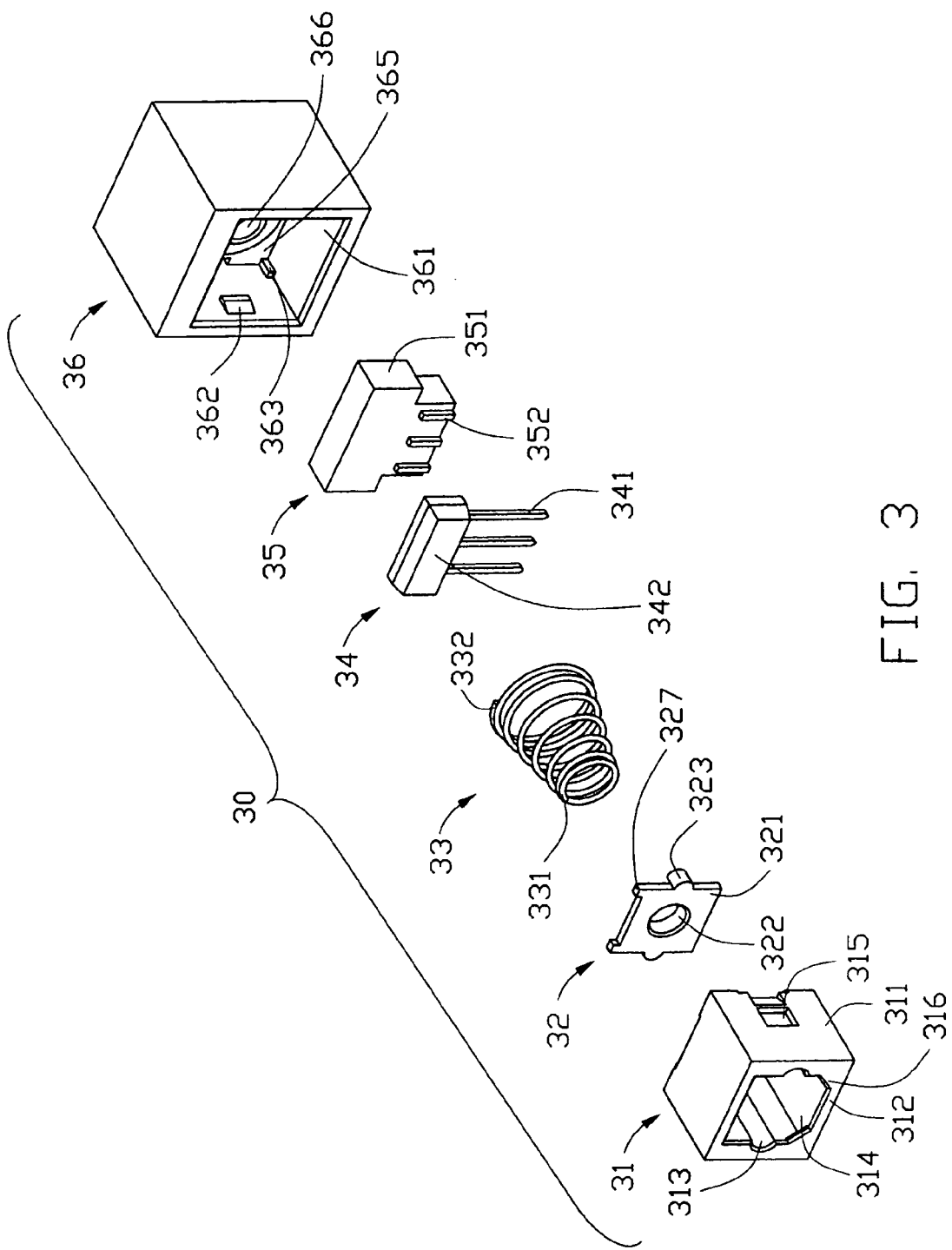
FIG. 3 is an exploded, perspective view of an optical fiber connector in accordance with the present invention.
Figure 4:
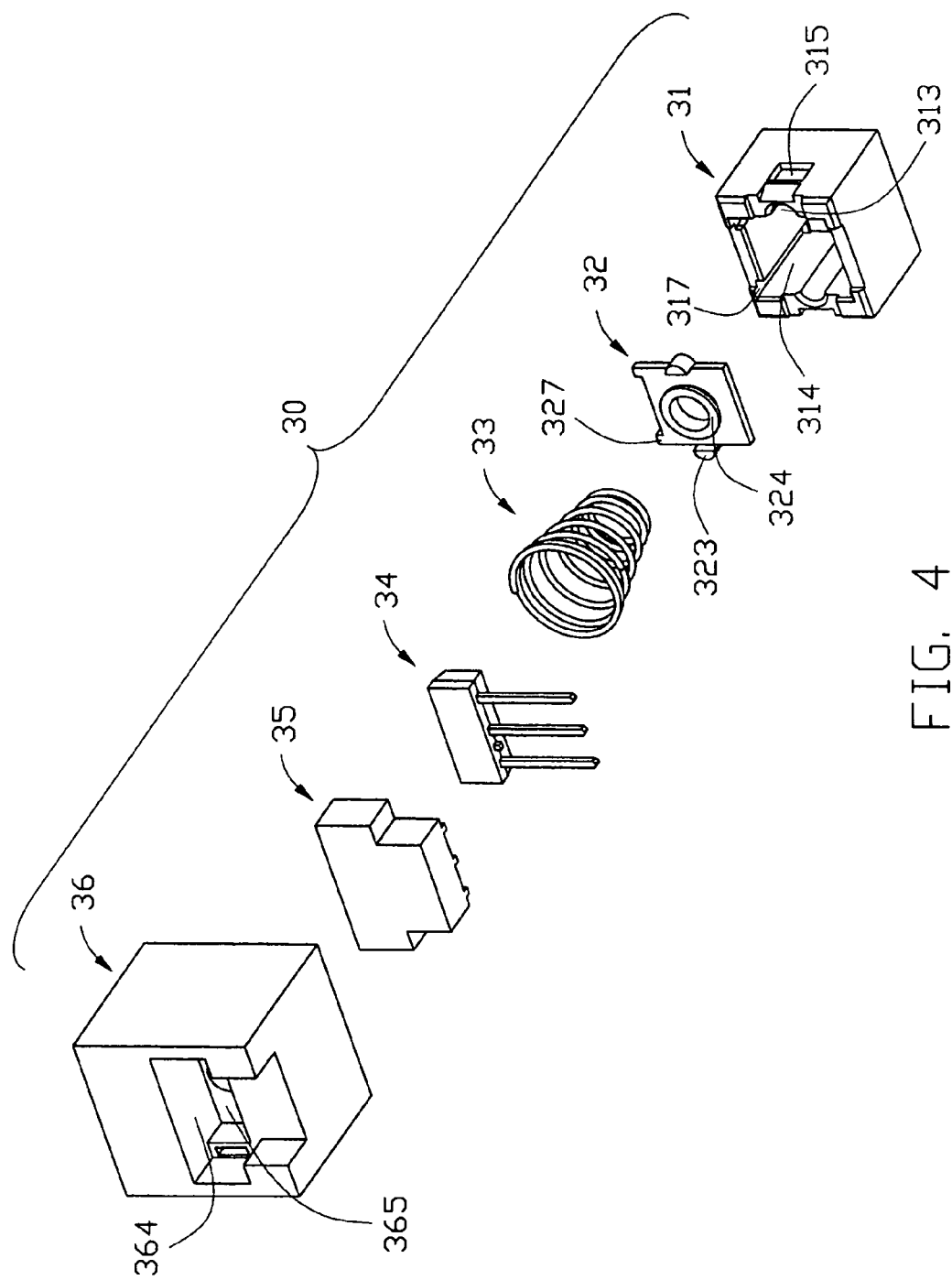
FIG. 4 is a view similar to FIG. 3 while taken from a different angle.
Figure 5:
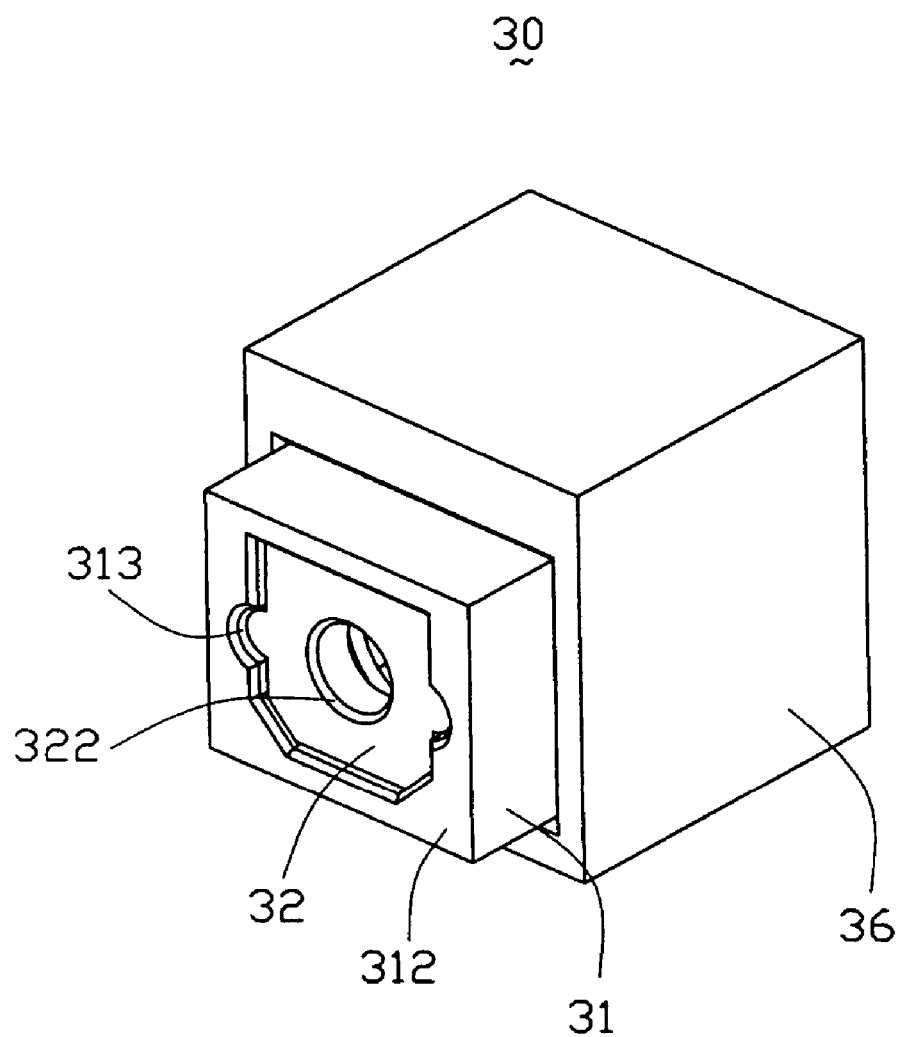
FIG. 5 is an assembled, perspective view of FIG. 3.

With reference to FIGS. 3–5, an optical fiber connector 30 comprises a housing, an optical element 34 received in the housing, a protecting member and a holder 35.

The housing of the optical fiber connector 30 is formed with an outer housing 36 and an inner housing 31. The outer housing 36 defines a room 361 in a front end thereof, and a receiving space 364 in a rear end thereof. A partition wall 365 is formed between the room 361 and the receiving space 364. The outer housing 36 has a pair of keys 362 formed at opposite inner side walls thereof, and four ribs 363 projecting from the partition wall 365 along the inner side walls. The partition wall 365 defines an opening 366 in a center thereof, which communicates with the receiving space 364 and the room 361.

The inner housing 31 is received in the outer housing 36 with a front end thereof exposed outside the outer housing 36. The inner housing 31 defines a cavity 314 therethrough, a pair of guiding grooves 313 at opposite inner sides thereof, a pair of recesses 315 at opposite outer sides for engaging with the keys 362 of the outer housing 36, and a pair of opposite grooves 317 at a top wall thereof. The inner housing 31 comprises a faceplate 312 having a pair of opposite bevels 316 at a bottom thereof. The inner housing 31 is inserted into the room 361 of the outer housing 36 until a rear face thereof contacted with front ends of the ribs 363 and the keys 362 retained in corresponding recesses 315.

The optical element 34 is formed with a base portion 342 and a plurality of legs 341 for connecting with a printed circuit board (not shown). The holder 35 and the optical element 34 are received in the receiving space 364 of the outer housing 36 together, with a body portion 351 and a plurality of protrusions 352 of the holder 35 abutting against the base portion 342 and the legs 341 of the optical element 34, respectively.

The protecting member is vertically and slideably received in the cavity 314 of the inner housing 31 and comprises a door 32 and a tapered spring member 33 assembled to the door 32. The spring member 33 comprises a first end 331 and a second end 332 having a larger diameter than that of the first end 331. The door 32 comprises a base plate 321, a pair of fixing projections 327 projecting upwardly from the base plate 321, a spring engaging portion 326 (FIG. 7) extending rearwardly from the base plate 321, an aperture 322 extending through the base plate 321 and the spring engaging portion 326, a ringed portion 324 protruding outwardly along a periphery edge of the extending portion 326, and a fixing slit 325 defined between the ringed portion 324 and the base plate 321 for fixing the first end 331 of the spring member 33 therein. A pair of arcuate protrusions 323 is formed at opposite sides of the base plate 321 and is slideably received in the guiding grooves 313 of the inner housing 31 so as to permit horizontal movement of the door 32 in the inner housing 31. The bevels 316 of the inner housing 31 perform a stopping function as to prevent the door 32 from being pushed out of the inner housing 31 by a spring force exerted by the spring member 33. The fixing projections 327 of the door 32 are slideably received in the grooves 317 of the inner housing 31.

Figure 6:
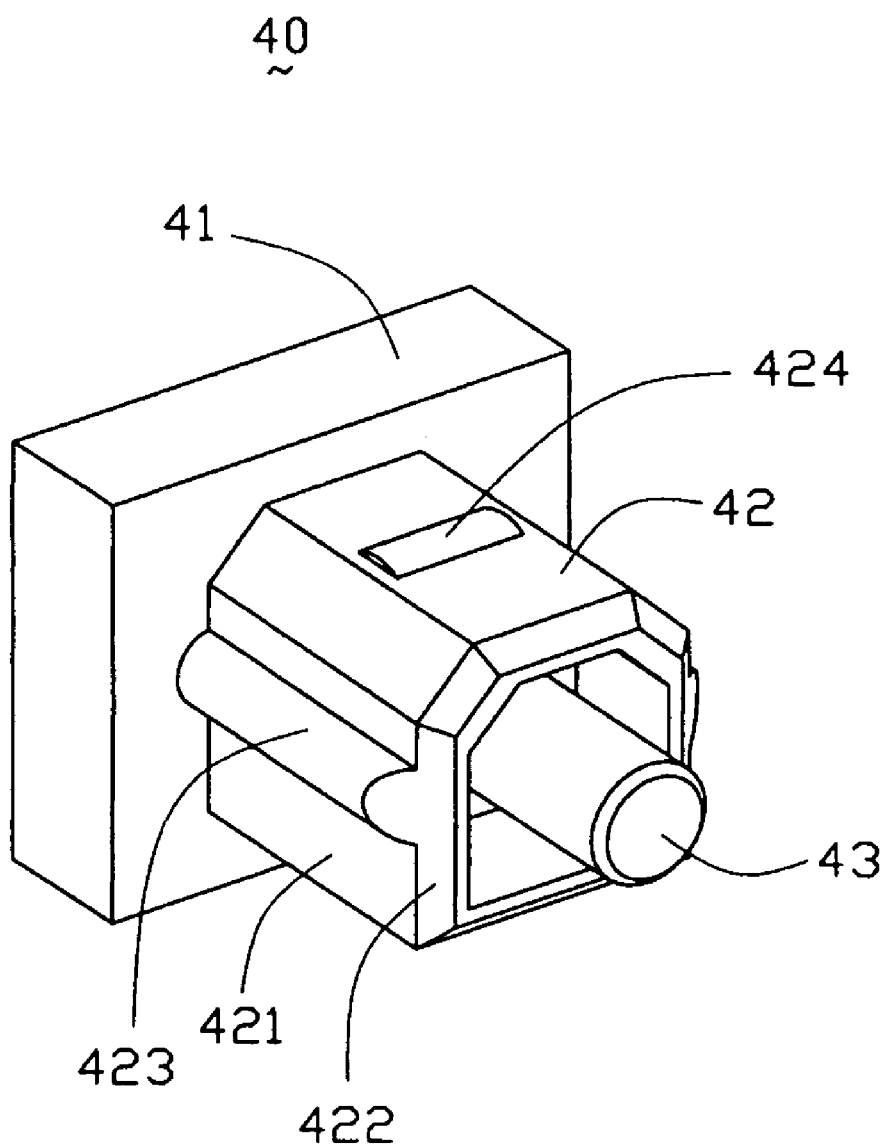
FIG. 6 is a perspective view of a complementary optical fiber plug connector.

Referring to FIG. 6, a fiber plug 40 comprises a main body 41, a transmitting rod 43 and a mating portion 42 extending from the main body 41. The transmitting rod 43 projects from a center of the main body 41 and is surrounded by the mating portion 42 with one end thereof extending beyond a front face 422 of the mating portion 42. The mating portion 42 is formed with a pair of opposite ribs 424 on a top face and a bottom face thereof, and a pair of guiding bars 423 on opposite side walls 421 for engaging in the guiding grooves 313 of the inner housing 31.

Figure 7:
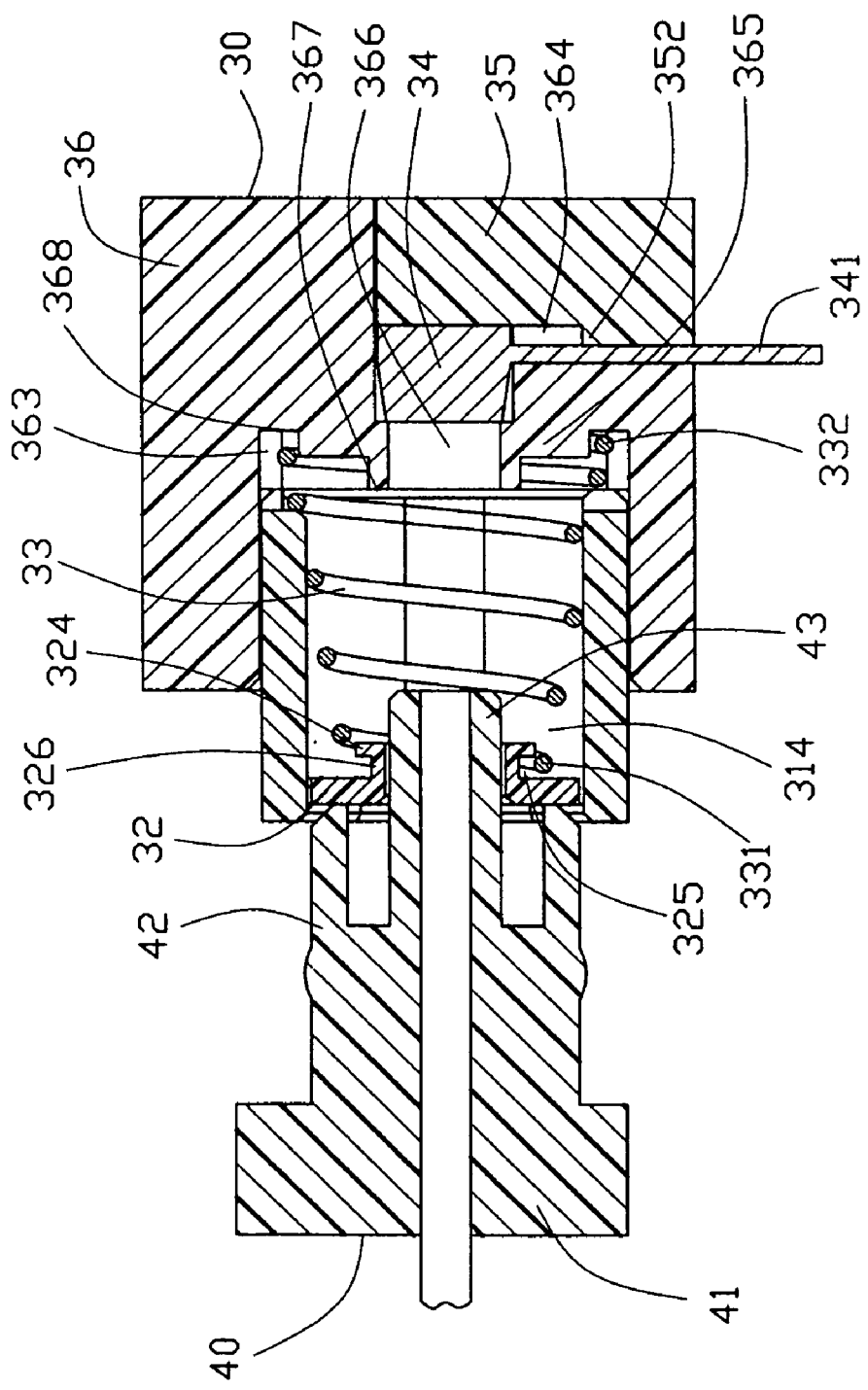
FIG. 7 is a cross-sectional view of the optical fiber connector with a complementary fiber plug connector partly inserted therein.
Figure 8:
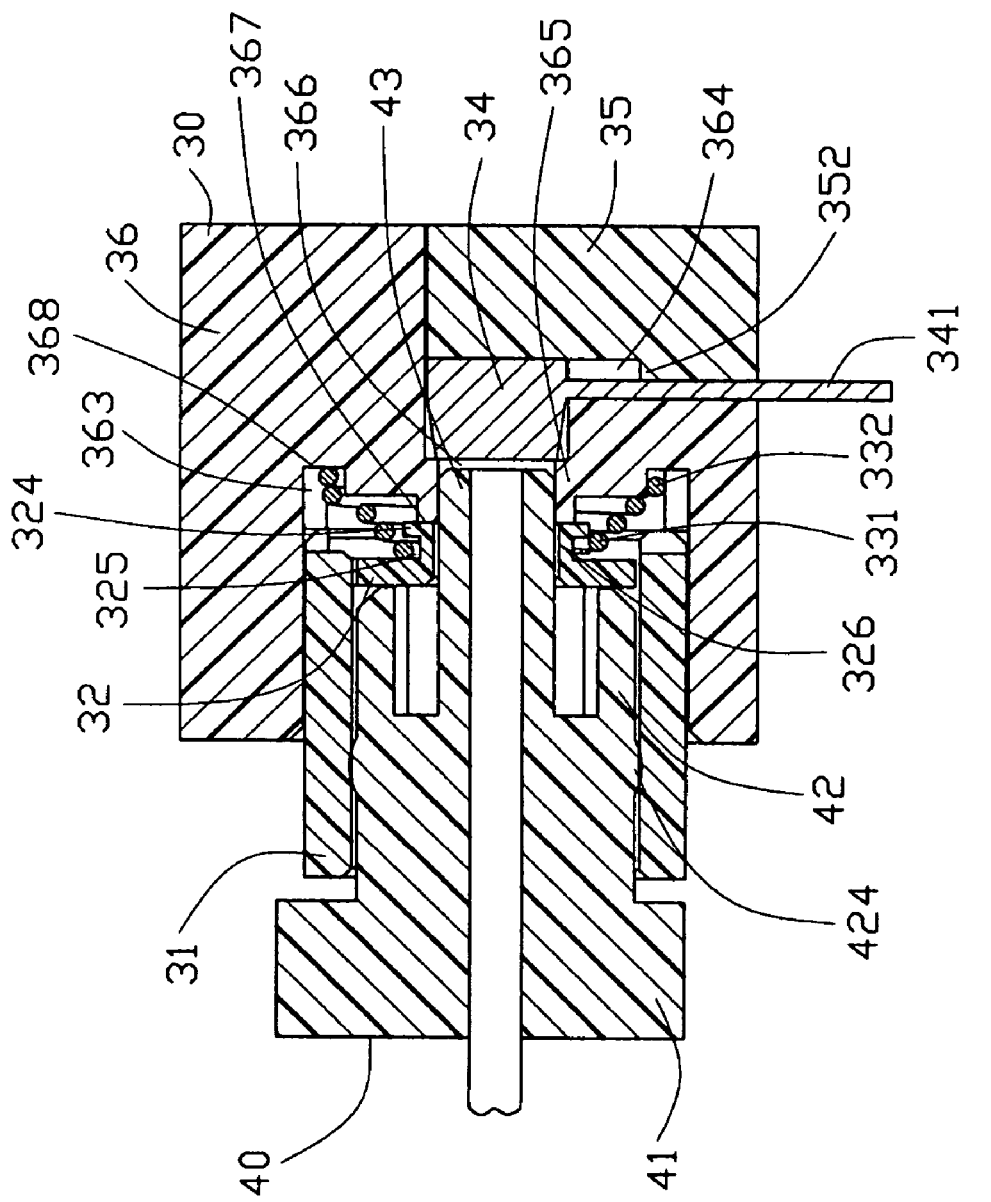
FIG. 8 is a cross-sectional view of the optical fiber connector with the complementary fiber plug connector completely inserted therein.

Referring to FIGS. 7–8, when the fiber plug 40 is to be inserted into the optical fiber connector 30, the transmitting rod 43 firstly passes through the aperture 322 of the door 32 and then inserts into the cavity 314 of the inner housing 31 until the front face 422 of the fiber plug 40 presses against the base plate 321 of the door 32. Whereby a guiding engagement between the guiding bars 423 of the fiber plug 40 and the guiding grooves 313 of the inner housing 31. When the fiber plug 40 is completely inserted into the optical fiber connector 30, the spring member 33 is deformed with the second end 332 pressing against an inner face 368 of the partition wall 365, while the base plate 321 of the door 32 abuts against a forward end of the partition wall 365. The transmitting rod 43 is inserted into the opening 366 of the partition wall 365 facing the optical element 34. When the fiber plug 40 is withdrawn from the optical fiber connector 30, the spring force of the spring member 33 urges the door 32 to return back to the front end of the cavity 314 of the inner housing 31. Because the door 32 defines the aperture 322 therethrough for allowing the transmitting rod 43 of the fiber plug 40 to pass through, the transmitting rod 43 can avoid being frayed by the door 32 during an insertion. Aside from that, since the protecting member is slideably and vertically received in the housing, the space is effectively saved. Thus, the optical fiber connector 30 can keep a small length and is in favor of minimized view of the connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An optical fiber connector comprising:
   a housing defining a cavity and a receiving space;
   an optical element received in the receiving space of the housing; and
   a protecting member received in the cavity of the housing and comprising a door and a spring member assembled to the shielding door, the door being slidable in the cavity along a liner front-to-back direction against the spring member when a mating plug is inserted/withdrawn.

2. The optical fiber connector as described in claim 1, wherein the door comprises a base plate received in the cavity of the housing and an aperture extending through the base plate.

3. The optical fiber connector as described in claim 2, wherein said door comprises a spring engaging portion extending rearwardly from the base plate and a ringed portion protruding along a peripheral edge of the spring engaging portion.

4. The optical fiber connector as described in claim 3, wherein the door defines a fixing slit between the ringed portion and the base plate for fixing one end of the spring member therein.

5. The optical fiber connector as described in claim 1, wherein the spring member comprises a first end and a second end having a larger diameter than that of the first end.

6. The optical fiber connector as described in claim 1, wherein the housing comprises an outer housing defining the receiving space therein and a room in a front end thereof, and an inner housing received in the room and defining the cavity.

7. The optical fiber connector as described in claim 6, wherein the outer housing comprises a partition wall defining in a center thereof an opening which communicates the receiving space and the room.

8. The optical fiber connector as described in claim 6, wherein the outer housing comprises a pair of keys at opposite inner side walls thereof, and the inner housing comprises a pair of recesses at opposite outer sides for engaging with the keys.

9. The optical fiber connector as described in claim 6, wherein the inner housing defines a pair of grooves in an inner top wail thereof, and the door comprises a pair of fixing projections received and sliding in the grooves with the inserting/withdrawing of the mating plug.

10. The optical fiber connector as described in claim 6, wherein the inner housing defines a pair of guiding grooves in inner side walls thereof, and the door comprises a pair of arcuate protrusions at opposite sides thereof received and sliding in the guiding grooves with the inserting/withdrawing of the mating plug.

11. The optical fiber connector as described in claim 1, further comprising a holder for fixing the optical element in the housing.

12. An optical fiber connector assembly comprising:
    a housing defining a cavity and a receiving space behind the cavity;

an optical element received in the receiving space of the housing;

a fiber plug mateable with said housing:

a door comprising a base plate received in the cavity of the housing and defining an aperture therethrough for allowing insertion of the fiber plug; and a spring member assembled to the door, when the fiber plug is inserted into the cavity, the door together with the spring member being horizontally moved therein.

13. The assembly as described in claim 12, wherein the housing comprises an outer housing defining the receiving space therein and a room in a front end thereof, and an inner housing received in the room and defining the cavity therein.

14. An optical fiber connector assembly comprising:

a housing defining a cavity and a receiving space behind the cavity;

an optical element received in the receiving space of the housing;

a fiber plug mateable with said housing;

a door comprising a base plate received in the cavity of the housing and defining an aperture therethrough for allowing insertion of the fiber plug; and a spring member disposed in the housing and urging the door to move forward;

wherein the door together with the spring member is moved horizontally in the cavity during mating or un-mating of the plug.

* * * * *